(12) United States Patent
Khalil et al.

(10) Patent No.: US 9,769,187 B2
(45) Date of Patent: Sep. 19, 2017

(54) ANALYZING NETWORK TRAFFIC BASED ON A QUANTITY OF TIMES A CREDENTIAL WAS USED FOR TRANSACTIONS ORIGINATING FROM MULTIPLE SOURCE DEVICES

(71) Applicant: Verizon Patent and Licensing Inc., Arlington, VA (US)

(72) Inventors: Manah M. Khalil, Coppell, TX (US); Vijaya R. Challa, Irving, TX (US); Sivarama Tallam, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 239 days.

(21) Appl. No.: 14/823,239

(22) Filed: Aug. 11, 2015

(65) Prior Publication Data

US 2017/0048258 A1    Feb. 16, 2017

(51) Int. Cl.
*H04L 29/06* (2006.01)

(52) U.S. Cl.
CPC ........ *H04L 63/1416* (2013.01); *H04L 63/101* (2013.01); *H04L 63/1425* (2013.01)

(58) Field of Classification Search
CPC ..................................................... H04L 43/10
USPC ............................................................ 726/7
See application file for complete search history.

(56) References Cited

U.S. PATENT DOCUMENTS

2006/0225130 A1* 10/2006 Chen ................. H04L 63/083
                                                        726/5
2008/0184349 A1* 7/2008 Ting ................. H04L 9/3231
                                                        726/7

* cited by examiner

*Primary Examiner* — Jacob Lipman

(57) ABSTRACT

A device may receive network traffic information, associated with multiple transactions, that indicates, for each transaction of the multiple transactions, a credential and a source device identifier associated with the transaction. The device may determine, based on the network traffic information, a quantity of times that a common credential was used in two transactions occurring at different times and originating from different source devices. The device may provide information that identifies the quantity of times and the different source devices. The device may determine whether to block network traffic associated with a source device, of the different source devices, based on the quantity of times and/or user input received based on providing the information that identifies the quantity of times and the different source devices. The device may selectively provide an instruction to block the network traffic associated with the source device based on this determination.

20 Claims, 18 Drawing Sheets

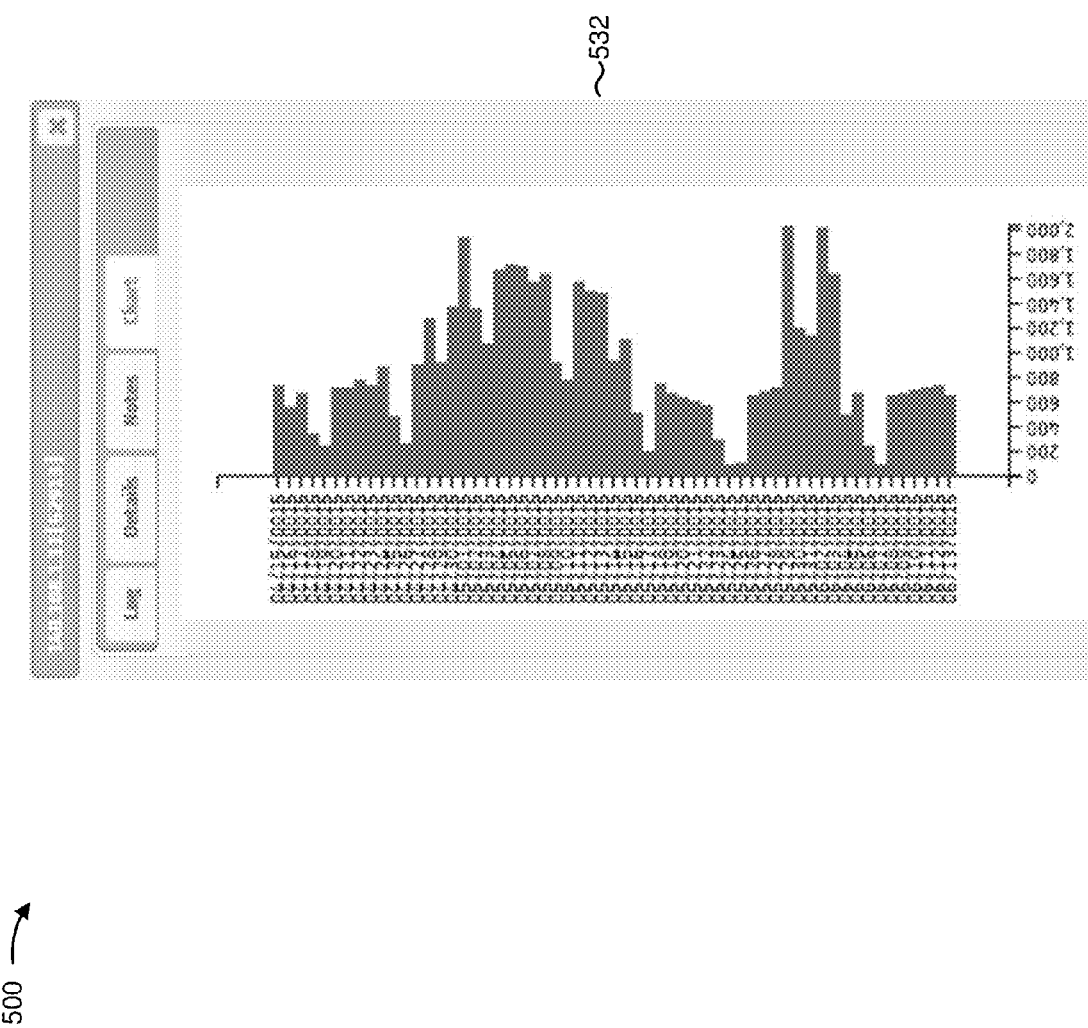

ANALYZING NETWORK TRAFFIC BASED ON A QUANTITY OF TIMES A CREDENTIAL WAS USED FOR TRANSACTIONS ORIGINATING FROM MULTIPLE SOURCE DEVICES

BACKGROUND

Many computer systems (e.g., operating systems, applications, email systems, websites, databases, networks, etc.) use credentials, such as a username and a password, for authentication before allowing access to a system. Authentication using credentials leaves systems open to a number of attacks by hackers. One common attack is a distributed attack. In a distributed attack, a hacker may utilize many devices (e.g., devices that have been compromised by the hacker) to attack the system. For example, the hacker may attempt to log into the system using stolen or fabricated credentials in an attempt to find a working combination of credentials.

DETAILED DESCRIPTION OF PREFERRED EMBODIMENTS

The following detailed description of example implementations refers to the accompanying drawings. The same reference numbers in different drawings may identify the same or similar elements.

Authentication using credentials, such as a username and password, may leave systems open to a number of attacks by hackers. One common attack is a distributed attack. In a distributed attack, a hacker may utilize many devices (e.g., devices that have been compromised by the hacker) to attack a protected system. For example, the hacker may attempt to log into the protected system using credentials that have been stolen or fabricated. These credentials may come from lists of stolen credentials from other websites (e.g., if another website is compromised, the hacker may believe that the credentials might be the same or similar for other websites). The hacker may attempt to use these credentials from multiple compromised devices.

It may useful for network operators to identify devices which have been compromised by hackers and are used for distributed attacks. Additionally, or alternatively, it may be useful for network operators to determine which credentials are being used for log in attempts, and which credentials have been compromised. Implementations described herein may aid in detecting compromised credentials and compromised devices by utilizing information about a quantity of times a credential was used for an attempt to log in or perform some other transaction from multiple source devices (e.g., potentially compromised source devices). In turn, network operators may block traffic from the compromised devices and/or block or provide an alert relating to the compromised credentials, thereby increasing the security of the protected system and limiting the use of processor resources being used in association with handling attempts to log in or perform another transaction from these compromised devices or using these compromised credentials.

Figure 1:
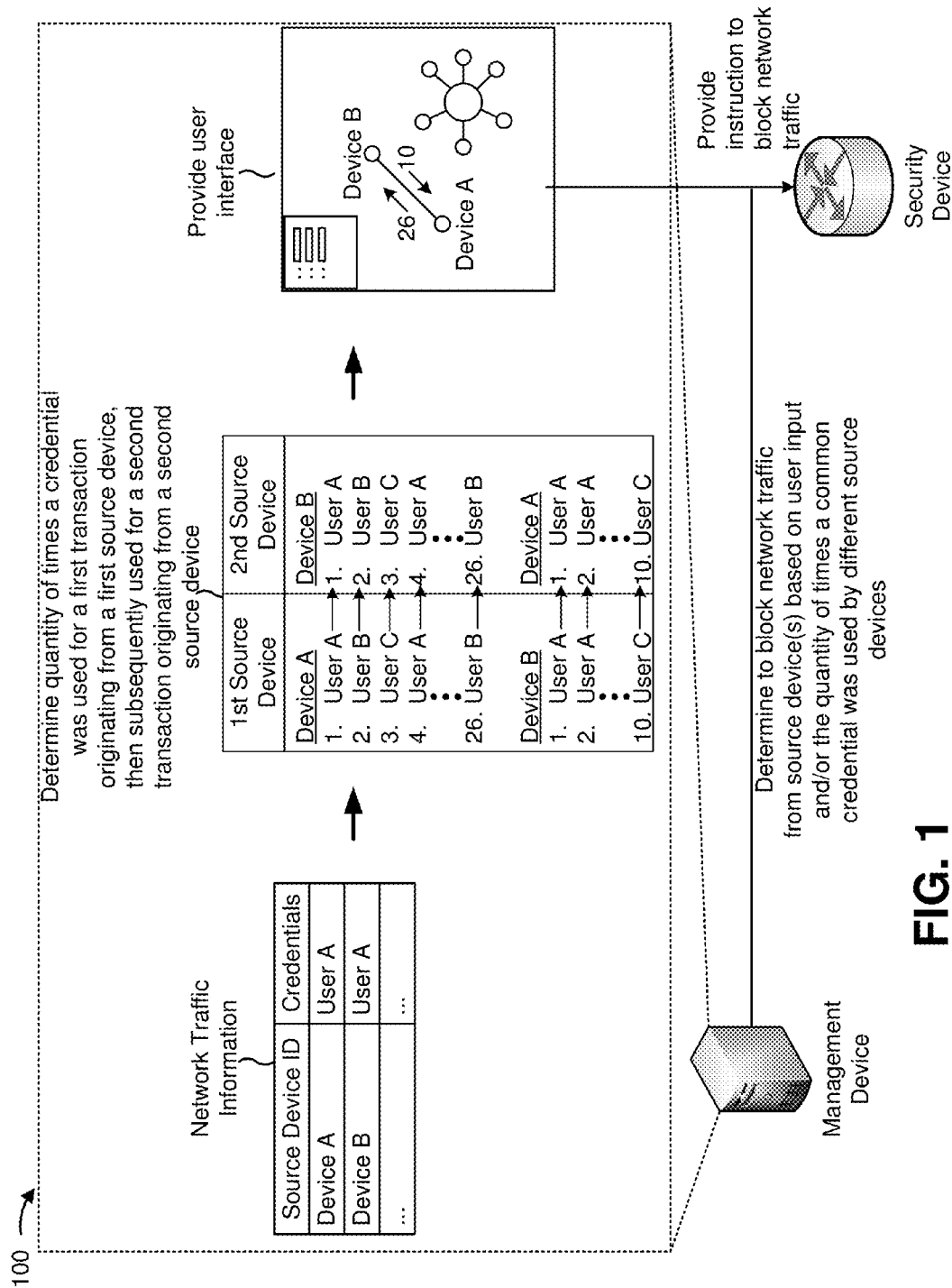
FIG. 1 is a diagram of an overview of an example implementation described herein.

FIG. 1 is a diagram of an overview of an example implementation 100 described herein. As shown in FIG. 1, assume that example implementation 100 includes a management device and a security device. The management device may receive network traffic information about transactions (e.g., an authentication attempt, such as an attempt to log in, an attempt to purchase a product or service, a secure communication, or the like) associated with a protected system associated with the management device. The network traffic information may associate a credential used for the transaction (such as a username, password, name, credit card number, etc.), with a source device, identified by a device identifier, used to perform the transaction. The device identifier may be a device name, a network address (e.g., a media access control (MAC) address, an Internet Protocol (IP) address, or the like), or the like. In the provided example, the network traffic information shows that a credential of User A was used by Device A for a transaction with the protected system and was later used by Device B for a transaction with the protected system.

The management device uses the network traffic information to determine a quantity of times a credential was used for a first transaction originating from a first source device, and then subsequently used for a second transaction originating from a second source device. In other words, the management device may analyze the network traffic for movement of credentials from one source device to another source device, which may indicate that the credential has been compromised. For example, as shown, the management device determines that on 26 occasions, a credential was used for a transaction originating from Device A and was then used for a subsequent transaction originating from Device B. Similarly, there are ten occasions in which a credential was used for a transaction originating from with Device B, and then was subsequently used for a transaction originating from Device A.

The management device provides a user interface which displays a representation (e.g., a graphical representation) of information related to the quantity of common credentials and the multiple source devices. For example, as shown, Device A is represented by a circle sized to represent the number of transactions originating from Device A, and Device B is represented by a circle sized to represent the number of transactions originating from Device B. A line connecting Device A and Device B represents that there are common credentials used in transactions originating from both Device A and Device B. The number 26 with an arrow from Device A to Device B represents that on 26 occasions a credential was used by Device A for a transaction, and then subsequently used by Device B for a later transaction. Similarly, the number ten with an arrow from Device B to Device A represents that on ten occasions a credential was used by Device B for a transaction, and then subsequently used by Device A for a later transaction. Likewise, circles and lines may describe other devices and common credentials.

The management device determines to block network traffic from source devices based on user input and/or the quantity of times a common credential was used by different source devices, as determined above. For example, an operator utilizing the user interface may provide input to block traffic from a source device. Additionally, or alternatively, the management device may automatically (without user input) determine to block traffic from a source device based on a threshold quantity of times a common credential was used for transactions originating from the source device and other source devices. The management device provides an instruction to block traffic, based on the determination to block network traffic from source device(s), to the security device, which in turn blocks the network traffic from the source device(s).

Analyzing the quantity of times a credential was used by different source devices over time, may provide a metric helpful in identifying compromised devices and compromised credentials. Utilizing the metric by blocking traffic associated with the compromised devices or compromised credentials may lead to additional network security. The additional network security may lead to data associated with users in the protected system and devices in the protected system becoming more secure and less susceptible to being compromised, damaged, or over-utilized. Furthermore, blocking traffic may help preserve processor and memory resources by lowering the quantity of transactions that the protected system handles.

Figure 2:
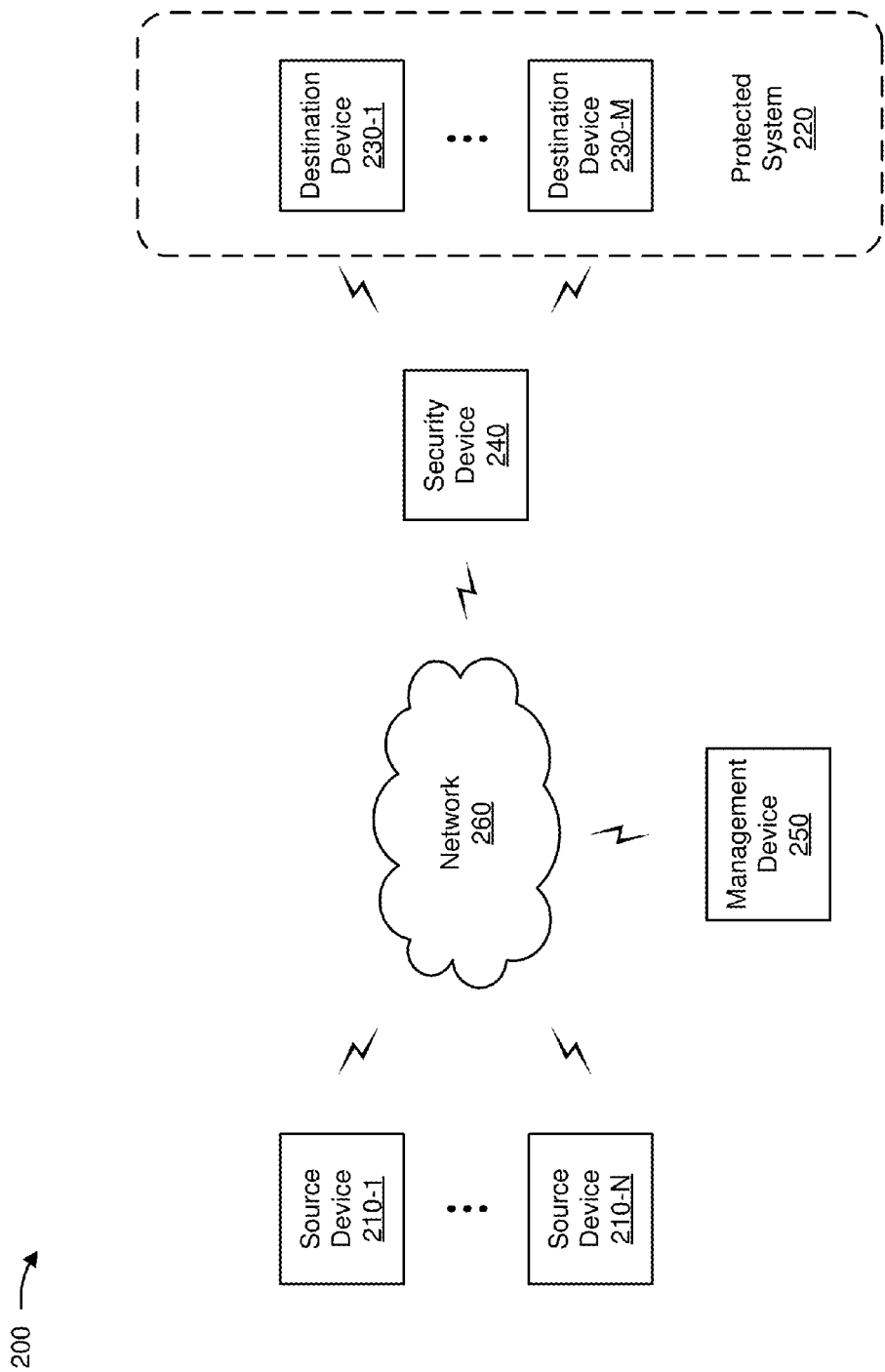
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more source devices 210-1 through 210-N (N≥1) (hereinafter referred to collectively as "source devices 210," and individually as "source device 210."), a protected system 220, one or more destination devices 230-1 through 230-M (M≥1) (hereinafter referred to collectively as "destination devices 230," and individually as "destination device 230."), a security device 240, a management device 250, and/or a network 260. Devices of environment 200 may interconnect via wired connections, wireless connections, or a combination of wired and wireless connections.

Source device 210 may include one or more devices capable of receiving, generating, storing, processing, and/or providing information associated with protected system 220. For example, source device 210 may include a computing device, such as a server, a mobile phone (e.g., a smart phone, a radiotelephone, etc.), a desktop computer, a laptop computer, a tablet computer, a handheld computer, or a similar type of device. In some implementations, source device 210 may attempt to access protected system 220 or destination devices 230 associated with protected system 220 via security device 240 and network 260. If source device 210 is permitted access to protected system 220 by security device 240, source device 210 may utilize protected resources (e.g., of destination devices 230) and protected systems associated with protected system 220.

Protected system 220 may include one or more destination devices 230 capable of receiving, generating, storing, processing, and/or providing information about and/or access to a protected service or a protected resource. For example, a protected service may include an application, web service, e-mail, or the like. A protected resource may include a database, a network, a computing resource, a storage warehouse, or the like. In some implementations, source device 210 may be granted or denied access to protected system 220 by security device 240. In turn, protected system 220 may provide information about or access to, using destination devices 230, protected services and protected resources associated with protected system 220.

Destination device 230 may include one or more devices capable of receiving, generating, storing, processing, and/or providing information about and/or access to a protected service or a protected resource. For example, destination device 230 may include a computing device, such as a server (e.g., an e-mail server, a firewall, a web server, a database server, etc.), a network device (e.g., a traffic transfer device, a gateway, a router, a modem, a switch, a firewall, a hub, a bridge, a load balancer, etc.), or a similar device. Destination device 230 may provide source device 210 with information about and access to a protected resource or protected service after source device 210 has been granted access to protected system 220 by security device 240.

Security device 240 may include one or more devices capable of receiving, processing, storing, generating, providing, and/or routing information related to network traffic between source devices 210 and protected system 220. For example, security device 240 may include a server (e.g., an authentication server, a proxy server, etc.), a network device (e.g., a traffic transfer device, a gateway, a router, a modem, a switch, a firewall, a hub, a bridge, a load balancer, etc.), or a similar device. In some implementations, security device 240 may permit or deny access to protected system 220 by source device 210 based on credentials provided by source device 210. In some implementations, security device 240 may verify the credentials. In some implementations, security device 240 may receive, from destination device 230, information that indicates whether the credentials are valid or invalid.

Management device 250 includes one or more devices capable of receiving, generating, storing, processing, and/or providing information related to network security. Management device 250 may include a computer, a server, or a similar type of device. In some implementations, management device 250 may receive network traffic information, from security device 240 and/or destination device 230, relating to transactions (e.g., authentication attempts, attempts to purchase a product or service, communications, or the like) that source device 210 performed with or attempted to perform with protected system 220. Management device 250 may analyze the network traffic information and/or may provide the network traffic information for display on an interface related to management device 250. Management device 250 may provide, to security device 240, an instruction to block traffic from source device 210 based on the analysis and/or user interaction with the interface.

Network 260 may include one or more wired and/or wireless networks. For example, network 260 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
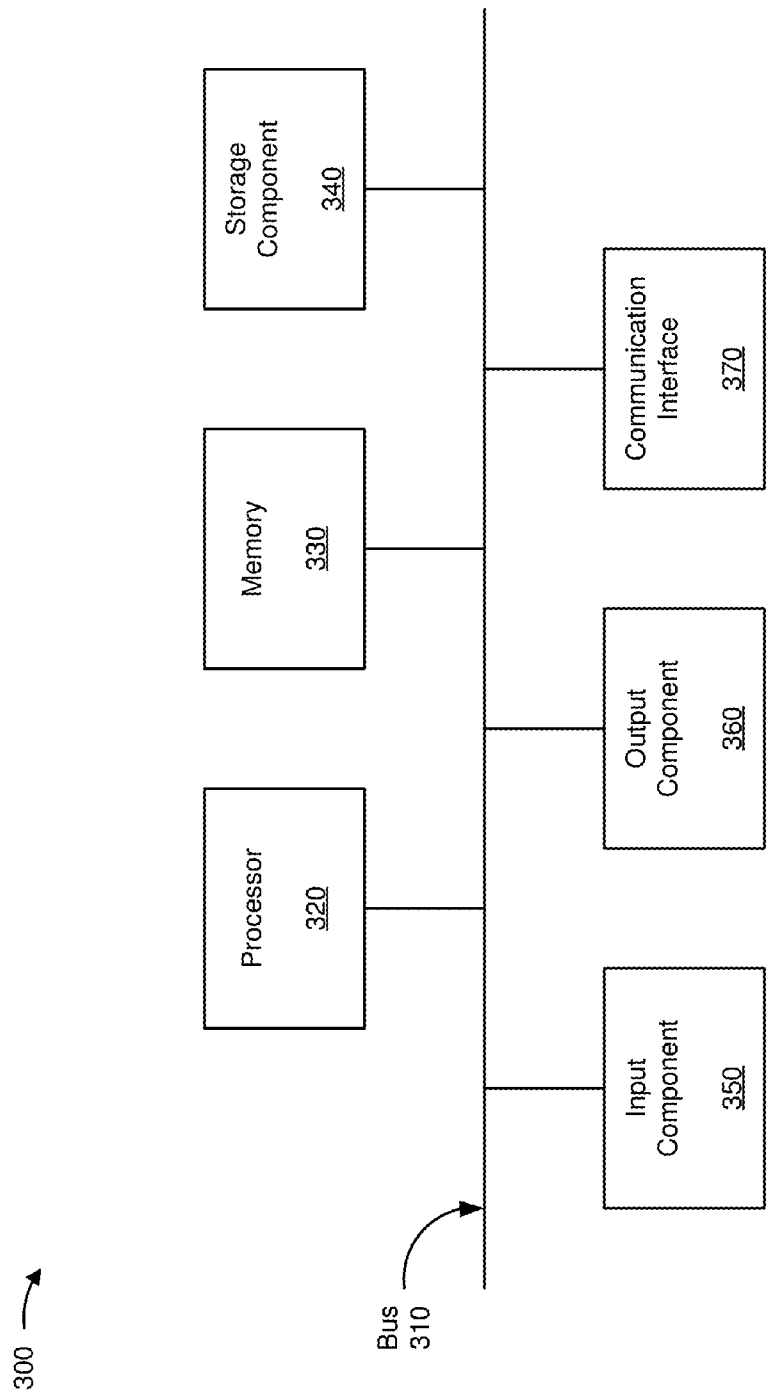
FIG. 3 is a diagram of example components of one or more devices of FIG. 2.

FIG. 3 is a diagram of example components of a device 300. Device 300 may correspond to source device 210, destination device 230, security device 240, and/or management device 250. In some implementations, source device 210, destination device 230, security device 240, and/or management device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. In some implementations, processor 320 may include one or more processors. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
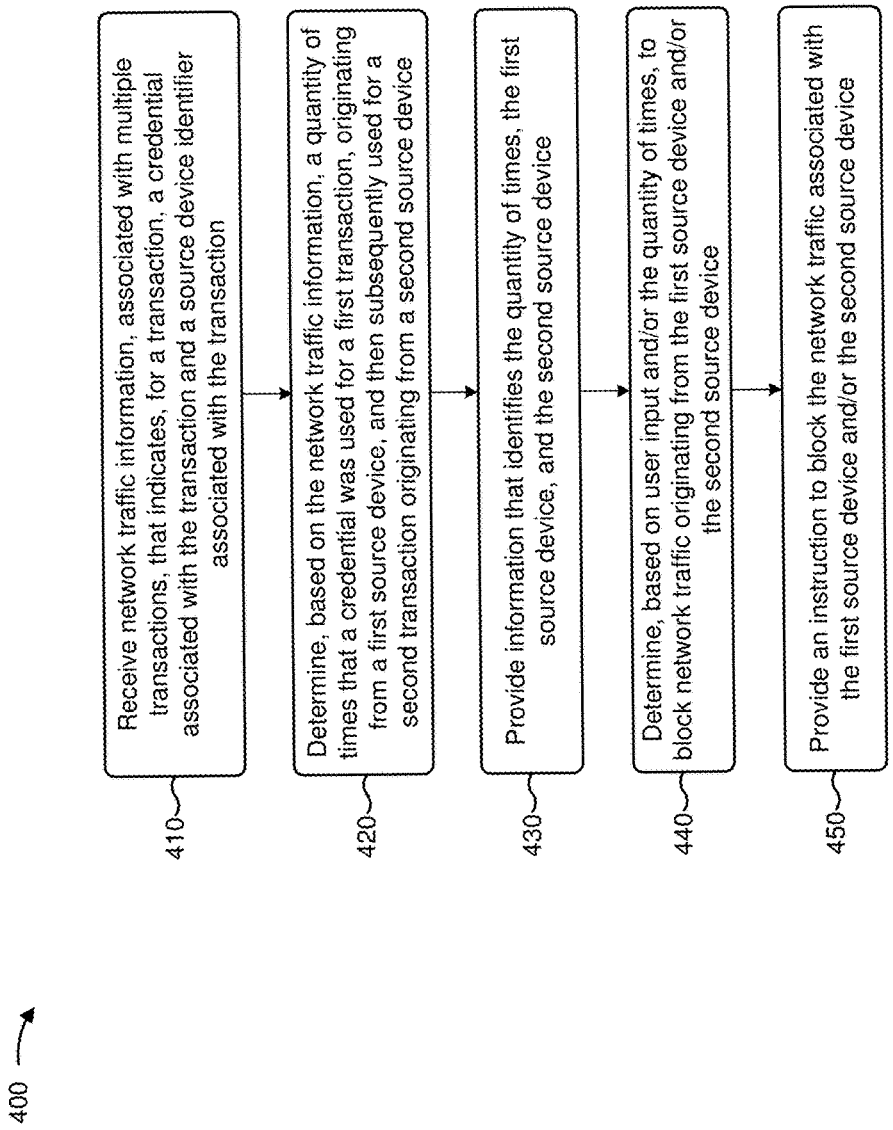
FIG. 4 is a flow chart of an example process for analyzing network traffic based on a quantity of times a credential was used for transactions originating from multiple source devices.

FIG. 4 is a flow chart of an example process 400 for analyzing network traffic based on a quantity of times a credential was used for transactions originating from multiple source devices. In some implementations, one or more process blocks of FIG. 4 may be performed by management device 250. In some implementations, one or more process blocks of FIG. 4 may be performed by another device or a set of devices separate from or including management device 250, such as source device 210, protected system 220, destination device 230, and/or security device 240.

As shown in FIG. 4, process 400 may include receiving network traffic information, associated with multiple transactions, that indicates, for a transaction, a credential associated with the transaction and a source device identifier associated with the transaction (block 410). For example, management device 250 may receive network traffic information. In some implementations, management device 250 may monitor and capture network traffic information from network 260. Additionally, or alternatively, management device 250 may gather the network traffic information from logs (e.g., single sign-on (SSO) logs, logs of attempts to log in, etc.) associated with devices, such as security device 240 or destination device 230. Additionally, or alternatively, security device 240 or destination device 230 may send the network traffic information to management device 250 via network 260.

In some implementations, management device 250 may receive network traffic information associated with multiple transactions. A transaction may be any attempted communication between source device 210 and protected system 220 in which a credential used in the attempted communication is available to protected system 220 and/or security device 240. For example, a transaction may include a log in attempt, an attempted purchase, a secure communication after a log in, or the like.

In some implementations, the network traffic information may include a credential associated with a transaction. The credential may identify or be uniquely associated with a particular user who has access to a protected service (e.g., an application, a web service, etc.) or a protected resource (e.g., a database, a network, etc.) that is associated with protected system 220. The credential may include a unique character string, such as a username, an e-mail address, or the like. Additionally, or alternatively, the credential may include a password. Additionally, or alternatively, the credential may include other information associated with a user, such as a credit card number, a name of the user, a street address of the user, or the like.

In some implementations, the network traffic information may include a source device identifier associated with a transaction. The source device identifier may identify the source device 210 from which the transaction originated or that participated in the transaction with protected system 220. For example, the source device identifier may be a name of source device 210 (e.g., a string of characters unique to source device 210), a network address of source device 210 (e.g., a media access control (MAC) address or an internet protocol (IP) address, etc.), or the like.

In some implementations, the network traffic information may include a timestamp associated with a transaction. The timestamp may identify the time and date, set to a standard, that the transaction was attempted (e.g., when a communication was sent or received).

In some implementations, the network traffic information may include information that identifies a result associated with a transaction. For example, when the transaction is an attempt to log in, the result may indicate that the user was able to log in (e.g., success), that the user was not able to log in (e.g., failure), or that the log in was not completed (e.g., unknown, such as when only a first step is attempted and completed for a two-step authentication). If the transaction is a purchase attempt, the result may indicate whether the purchase was completed.

As further shown in FIG. 4, process 400 may include determining, based on the network traffic information, a quantity of times that a credential was used for a first transaction, originating from a first source device, and then subsequently used for a second transaction originating from a second source device (block 420). For example, management device 250 may determine, based on the network traffic information, a quantity of times that a credential was used for a first transaction originating from a first source device 210, and then subsequently used for a second transaction originating from a second source device 210.

In some implementations, management device 250 may identify common credentials that were used for transactions originating from both the first source device 210 and the second source device 210 (e.g., at different times). When a common credential was used by the first source device 210 and the second source device 210, management device 250 may sort all of the transactions using this common credential by the timestamp associated with the transactions. Management device 250 may identify, using the timestamps, a jumping occurrence (e.g., a jump) in which the common credential was used in a transaction originating from the first source device 210, (e.g., the first transaction), and where the most immediate subsequent transaction using the credential was a transaction originating from the second source device 210 (e.g., the second transaction). Management device 250 may count each of these jumps for the common credential when determining the quantity of times. Furthermore, management device 250 may identify and tally each of these jumps for each common credential when determining the quantity of times.

As used herein, a jump may refer to each time a credential is used by a source device 210 for a transaction, and then is used by another source device 210 for a consecutive transaction (e.g., an immediate subsequent transaction for the credential, with no intervening transactions that use the credential). Management device 250 may increment a jump counter for the credential each time a jump occurs for the credential. Management device 250 may increment the jump counter when the credential is being used for the first time or when the credential is repeated (e.g., used for a previous jump). Management device 250 may count the quantity of jumps for all credentials between source devices 210, and may use the quantity of jumps to analyze and/or block network traffic as described below.

In some implementations, when identifying the quantity of times, management device 250 may limit the transactions originating from both the first source device 210 and the second source device 210 by including only transactions from the network traffic information that occurred over a specific time range. The specific time range may be used to include only transactions with a timestamp that occurs between the date and time picked for a start time and an end time.

Additionally, or alternatively, management device 250 may determine a quantity of times that the credential was used for a jump separately for each of the common credentials. Since management device 250 may be determining this as described above for each common credential separately in the process of finding the quantity of times, the quantity of times for a specific common credential may also be tracked.

Figure 5A:
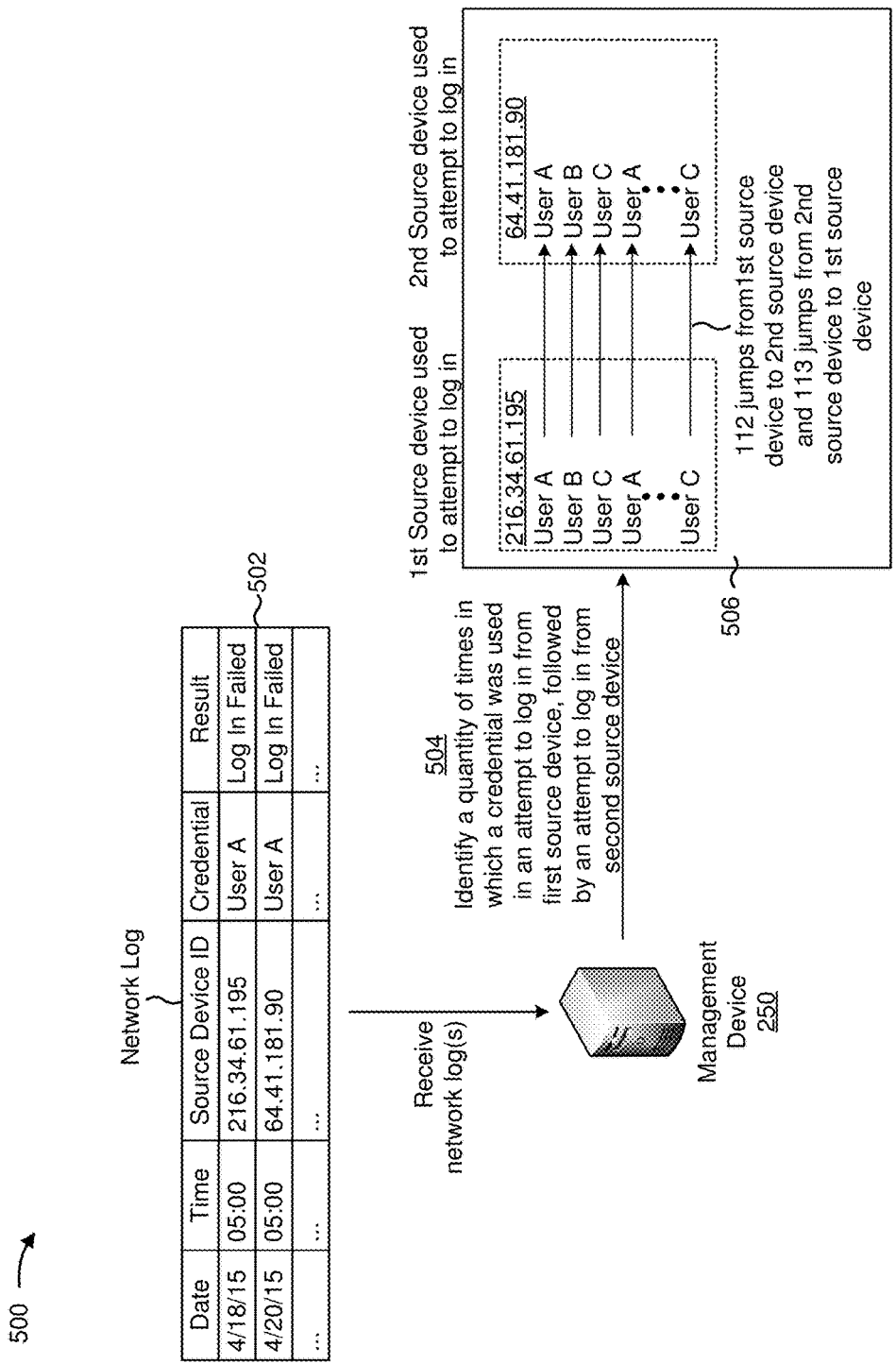
FIGS. 5A-5N are diagrams of an example implementation relating to the example process shown in FIG. 4.

As further shown in FIG. 4, process 400 may include providing information that identifies the quantity of times, the first source device, and the second source device (block 430). For example, management device 250 may provide, for display via a user interface, information that identifies the quantity of times, the first source device 210, and the second source device 210, as shown in FIGS. 5A-5N. In some implementations, the user interface may display representations for the first source device 210 and the second source device 210. Additionally, or alternatively, the user interface may display a representation of a link between the first source device 210 and second source device 210 (e.g., showing the first source device 210 and the second source device 210 as a connected pair) with an indication of the quantity of times that a credential was used for a transaction originating from the first source device 210 and then for the second source device 210 in a subsequent transaction (e.g., a consecutive transaction). Additionally, or alternatively, the link and the indication of the quantity of times may be associated with an arrow, provided for display, from the first source device 210 and pointing to the second source device 210 to represent that the credential was used for a first transaction with the first source device 210 before being used for a second transaction with the second source device 210. In other words, management device 250 may provide an indication of the quantity of jumps (e.g., for all credentials) from the first source device 210 to the second source device 210, and/or from the second source device 210 to the first source device 210.

In some implementations, the user interface may display representations of multiple source devices 210. A paired source device 210 may be in a connected pair with another source device 210. In some implementations, a jump may start from the paired source device 210 and move to the other source device 210 (e.g., when the paired source device 210 is a first source device 210 and the other source device 210 is a second source device 210). In some implementations, a jump may start from the other source device 210 and move to the paired source device 210. In some implementations, a jump may start from the paired source device 210 and move to the other source device 210, and another jump may start from the other source device 210 and move to the paired source device 210. In other words, paired connections can represent jumps going either way between source devices 210 in the paired connection or jumps going both ways between the source devices 210 in the paired connection. A paired source device 210 may have multiple other source devices 210 with which paired source device 210 forms a connected pair. For example, Device A may be in a connected pair with Device B, Device C, and Device D, and jumps may be going from Device A to Device B, Device C, and Device D (e.g., when Device A is a first source device 210 and Device B, Device C, and Device D are second source devices 210). Jumps may also be going from Device B and Device C to Device A (e.g., when Device B and Device C are first source devices 210 and Device A is a second source device 210).

Additionally, or alternatively, the user interface may provide an input mechanism for receiving input, such as a dialog box, that allows a user to change which representations of source devices 210 are displayed on the user interface. For example, the dialog box could allow the user to input parameters which limit the representations of source devices 210 displayed by criteria which include: a minimum threshold for the quantity of jumps, a maximum quantity of source devices 210 to display, a date range for identifying the quantity of jumps, the source device identifier, the credential, or the like. These parameters may be used in limiting and selecting source devices 210 which are represented on the user interface.

In some implementations, the user interface may include a quantity of transactions associated with a source device 210. For example, the user interface may indicate, for a source device 210, a quantity of transactions associated with source device 210. The quantity of transactions can be represented by a number near source device 210 or may be indicated by the size of the object used to represent source device 210 (e.g., the greater the number of transactions, the larger the size of the object). Additionally, or alternatively, results of the transactions (e.g., success, failure, or unknown) may be represented, on the user interface, by numbers that indicate the result of the transactions, or by using a color or shade coded pie chart within the object that represents source device 210.

Additionally, or alternatively, the user interface may include representations that indicate the source device identifier (e.g., by displaying the IP address), and the common credential. For example, the user interface may display the common credential when there is a query about a specific common credential, or when the quantity of jumps includes only a specific common credential. Additionally, or alternatively, the user interface may display information that shows the quantity of jumps for each common credential along with the common credential. For example, the user interface may display the quantity of jumps for each common credential along with the common credential in a data structure, such as a table.

Additionally, or alternatively, the user interface may display a number representing a quantity of unique common credentials used in the quantity of jumps (e.g., the quantity of jumps not counting any specific common credential more than once). Additionally, or alternatively, the user interface may provide information that displays a quantity of devices in a network that is connected to a source device 210. For example, if source device 210 is connected to a network that includes five devices, a line can be displayed between source device 210 and another symbol that represents the network and the number five can be displayed near the network or the line.

Additionally, or alternatively, the user interface may display information about a party associated with source device 210. This information may include a name of the party, geographic information about the party, or the like. This information may be displayed near source device 210 or by a dialog box accessed by clicking on or hovering over source device 210 or displayed nearby on the user interface.

Additionally, or alternatively, the user interface may display an indication that source device 210 is potentially a compromised source device 210 based on the information that identifies the quantity of times, and the source devices 210 with which the potentially compromised source device 210 forms connected pairs (e.g., related source devices 210). Using the same information, the user interface may display an indication that source device 210 is potentially a legitimate source device 210.

Additionally, or alternatively, the user interface may display an indication that source device 210 has been identified as a source device 210 that should be blocked (e.g., blacklisted), or as a source device 210 that should not be blocked (e.g., whitelisted). Additionally, or alternatively, the user interface may allow the user to identify source device 210 to be added to the whitelist or the blacklist.

In some implementations, a user may interact with the user interface to hide or show any of the above-listed information. For example, the user may provide input to display only the quantity of jumps and the source device identifier for each source device 210. Additionally, or alternatively, the user may provide input to add information that may change the display. For example, a user may be able to add information about the party associated with source device 210, or may blacklist source device 210.

In some implementations, the user interface may present the information related to and in relation to a particular source device 210 and connected pairs in which the particular source device 210 is a part. For example, the user interface may show only the quantity of jumps in relation to the particular source device 210. In these instances, the user interface may display only related source devices 210 which are in connected pairs with the particular source device 210 (e.g., only the source devices 210 that share jumps with the particular source device 210) along with numbers representing the quantity of jumps between the related source devices 210 and the particular source device 210. Other connected pairs where the particular source device 210 was not involved may not be displayed by the user interface.

As further shown in FIG. 4, process 400 may include determining, based on user input and/or the quantity of times, to block network traffic originating from the first source device and/or the second source device (block 440). For example, management device 250 may determine to block network traffic from the first source device 210 and/or the second source device 210 based on user input. In some implementations, management device 250 may receive the user input based on a user interaction with the user interface. The user input that management device 250 may use to determine to block network traffic from source device 210 may be based upon a request by the user (e.g., an operator) to add source device 210 to the blacklist. In some implementations, management device 250 may provide, via the user interface, a suggestion to block source device 210 before source device 210 is added to the blacklist. In some implementations, management device 250 may determine not to block network traffic from source device 210 based upon a request by the operator to add source device 210 to the whitelist. In some implementations, management device 250 may provide, via the user interface, a suggestion to allow traffic from the source device 210 before source device 210 is added to the whitelist.

In some implementations, management device 250 may determine to block network traffic from the first source device 210 and/or the second source device 210 based upon the quantity jumps from the first source device 210 to the second source device 210. For example, management device 250 may determine to block the first source device 210 when the quantity of jumps is greater than a threshold. In some implementations, management device 250 may determine to block a source device 210 when the total of all of the quantity of jumps associated with the source device 210 and the related source devices 210 is greater than a threshold. By determining to block network traffic originating from a source device 210 when the total quantity of jumps exceeds a threshold, management device 250 may be more likely to block network traffic associated with compromised source devices, thereby protecting protected system 220 and saving processor and memory resources.

Additionally, or alternatively, management device 250 may compare other factors to a threshold in addition to the quantity of jumps in making the determination to block source device 210. For example, management device 250 may use the quantity of unique common credentials as described above and compare the quantity of unique common credentials to a threshold (e.g., where the quantity of unique common credentials is greater than the threshold) in addition to the quantity of jumps. By comparing the quantity of unique common credentials to the threshold, management device 250 may be more likely to block network traffic associated with compromised source devices 210, thereby protecting protected system 220 and saving processor and memory resources.

Additionally, or alternatively, management device 250 may also analyze the quantity of transactions associated with a source device 210 and compare to a threshold (e.g., where the quantity of transactions is less than the threshold). When management device 250 identifies that source device 210 has a low quantity of transactions (e.g., as determined based on the threshold) and a high quantity of jumps (e.g., as determined based on the threshold), then management device 250 may determine to block traffic from source device 210. In some implementations, the threshold for one characteristic, such as the quantity of transactions, may change depending upon another characteristic, such as the quantity of jumps. By using the quantity of transactions when determining to block network traffic, management device 250 may be more likely to block network traffic associated with compromised source devices 210, thereby protecting protected system 220 and saving processor and memory resources.

Additionally, or alternatively, management device 250 may use the percentage of non-successful transactions (e.g., a failed transaction, an unknown transaction, or anything not classified as a successful transaction) associated with source device 210 when determining whether to block the traffic from source device 210. Management device 250 may not block traffic from source device 210 unless the percentage is greater than a threshold. By using the percentage of non-successful transactions when determining to block network traffic, management device 250 may be more likely to block network traffic associated with compromised source devices 210, thereby protecting protected system 220 and saving processor and memory resources.

Additionally, or alternatively, management device 250 may limit (e.g., based on user input), the transactions considered when determining the quantity of jumps or the other factors to a specified time range. For example, management device 250 may use only transactions that took place between a first day at noon and a second day at noon. More specifically, management device 250 may limit the time range that management device 250 uses for the first transactions and the time range that management device 250 uses for the second transactions separately. For example, management device 250 may use first transactions that occurred overnight for the first source device 210 and use second transactions that occurred the next day for the second source device 210. By limiting the time range, management device 250 may be able to focus on transactions that the user who inputs the time range finds more valuable (e.g., because protected system 220 was vulnerable in the time range, or because transactions completed during the time range are more suspect based on historical knowledge). Therefore, management device 250 may be more likely to block network traffic associated with compromised source devices 210, thereby protecting protected system 220 and saving processor and memory resources.

Additionally, or alternatively, management device 250 may identify relationships source device 210 has with related source devices 210 and information about the related source devices 210 before blocking source device 210. For example, management device 250 may identify source device identifiers associated with source device 210 and the related source devices 210 when determining whether source device 210 and the related source devices 210 are part of a network of devices such as a proxy cluster (e.g., a group of proxy servers). Additionally, or alternatively, management device 250 may identify the number of connected pairs of which source device 210 is a part, and the number of connected pairs of which the related source devices 210 are a part when determining whether to block source device 210. For example, if source device 210 is a part of five connected pairs, but each of the related source devices 210 is only a part of a connected pair with source device 210 (e.g., a hub and spoke pattern), then source device 210 may be blocked by management device 250 under the assumption that source device 210 is being used to hack the related source devices 210. As another example, if source device 210 is part of two connected pairs, and if the related source devices 210 form a connected pair with each other and with the source device 210 (e.g., a triangle pattern), then source device 210 may not be blocked by management device 250 under the assumption that the source device 210 is one of three locations that a particular credential or group of credentials is commonly used. In some implementations, the relationships may be considered in conjunction with other factors like the quantity of unique common credentials when making a determination to block source device 210.

Additionally, or alternatively, management device 250 may determine to block network traffic associated with a particular credential based on the user input, the quantity of jumps, or the other factors. For example, an operator, using the user interface, may input a request to block network traffic associated with a particular credential that is suspected of being compromised. Similarly, management device 250 may determine that the particular credential should be blocked because of suspected compromise (e.g., based on one or more of the many criteria described above).

As further shown in FIG. 4, process 400 may include providing an instruction to block the network traffic associated with the first source device and/or the second source device (block 450). For example, management device 250 may provide an instruction to cause security device 240 to block traffic from source device 210 to protected system 220 or from protected system 220 to source device 210.

In some implementations, management device 250 may provide an instruction to security device 240 to block traffic associated with a particular credential. For example, management device 250 may provide an instruction to security device 240 to block all traffic associated with the particular credential from protected system 220.

Implementations described herein may aid in detecting compromised credentials and compromised devices by utilizing information about a quantity of times a credential was used for consecutive transactions by different source devices. In turn, traffic from the compromised devices and/or associated with the compromised credentials may be blocked, thereby increasing the security of the protected system and protected resources within the protected system. Furthermore, blocking the traffic associated with the compromised devices or blocking the compromised credentials reduces the use of processor and memory resources being used in association with transactions from these compromised devices or using these compromised credentials.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5N are diagrams of an example implementation 500 relating to example process 400 shown in FIG. 4. FIGS. 5A-5N show an example of analyzing and/or blocking network traffic based on user input and/or a quantity of times a credential was used for transactions originating from multiple source devices.

As shown in FIG. 5A, and by reference number 502, assume that management device 250 receives network logs. The network log includes information about transactions, such as a time and date of a transaction, a source device identifier associated with a source device 210 from which the transaction originates, a credential used in the transaction, and a result associated with the transaction. For example, as shown, the first transaction listed occurred on Apr. 18, 2015 at 5:00 a.m. The first transaction occurred from a source device 210 with an IP address of 216.34.61.195, as shown. The first transaction was an attempt to log in using a credential of User A, which failed. Also listed is a second transaction, which was an attempt to log in using a credential of User A on Apr. 20, 2015 at 5:00 a.m. from a source device 210 with an IP address of 64.41.181.90. As shown by reference number 504, management device 250 identifies a quantity of times in which a credential was used in an attempt to log in from the first source device 210, followed by an attempt to log in from the second source device 210 (e.g., the quantity of jumps). As shown by reference number 506, management device 250 quantifies the jumps by determining the transactions in which a credential was used by the first source device 210 prior to and most recently before the transaction by the second source device 210 (e.g., consecutive transactions).

Figure 5B:
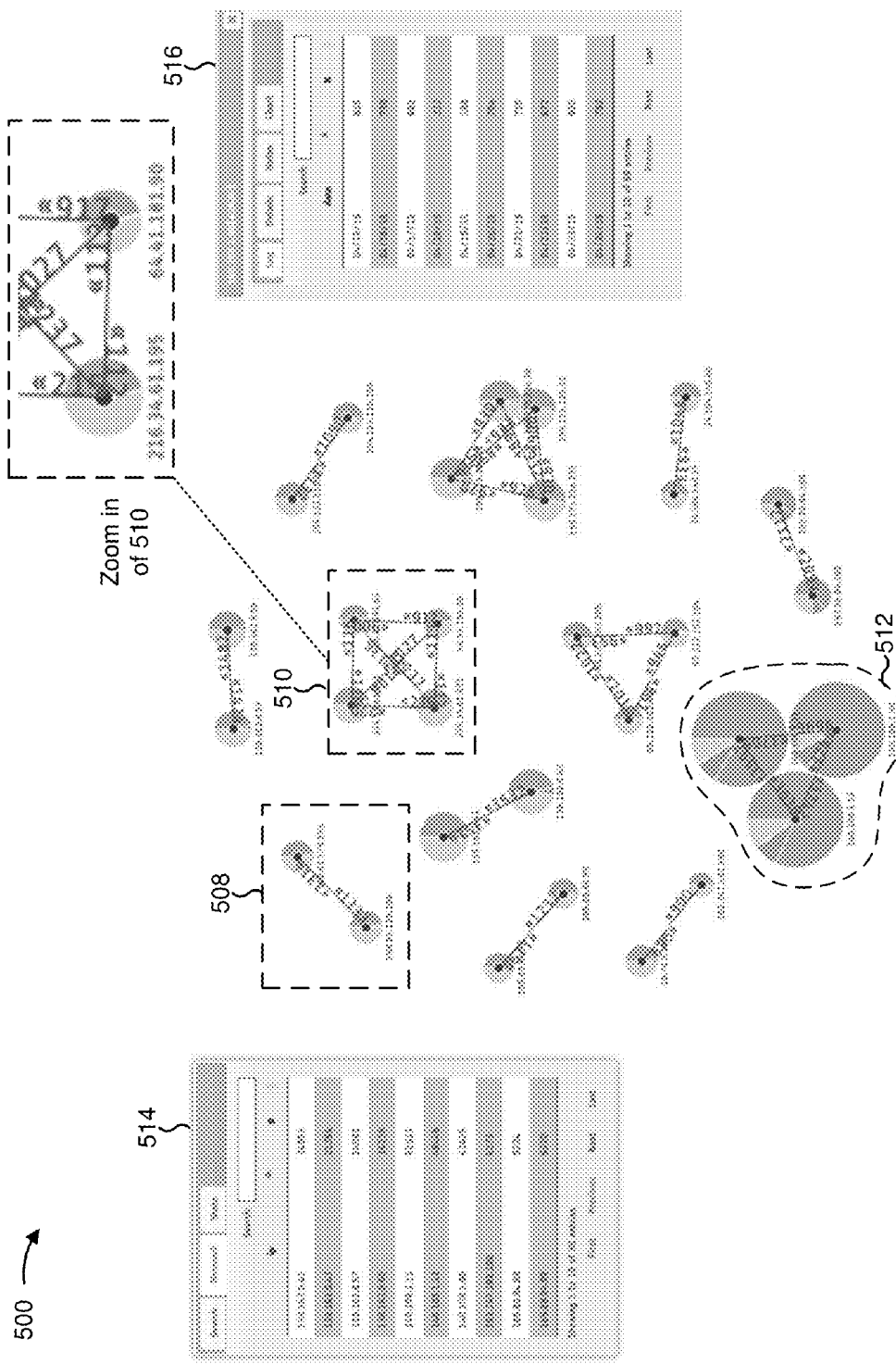

As shown in FIG. 5B, assume that management device 250 represents information from the network logs using a user interface, such as the one shown. As shown by reference number 508, the user interface displays representations of source devices 210 as circles and displays the associated IP address for each source device 210. A line that connects the two source devices 210 is used to represent a relationship between the source devices 210 as both source devices 210 have been used for an attempt to log in using a common credential (e.g., making the source devices 210 a connected pair). The numbers with the arrows (1,333 and 1,314) represent the quantity of jumps from one source device 210 to another source device 210. For example, as shown, there were 1,314 attempts to log in using a credential originating from source device 210 identified by an IP address of 198.81.129.93, where the credential was later used for a log in attempt originating from source device 210 identified by an IP address of 198.81.129.94. The 1,314 attempts on both source devices 210 could be all using one unique credential, 1,314 unique credentials, or any combination in between.

As shown by reference number 510, the user interface can be used to display relationships between multiple source devices 210. For example, as shown, four source devices 210 are displayed in a cluster, and each source device 210 has a relationship with the other three source devices 210. Two of the source devices 210, identified by the IP addresses 216.34.61.195 and 64.41.181.90, correspond to source devices 210 from the network log in FIG. 5A, and have a quantity of jumps associated with the quantities from FIG. 5A.

As shown by reference number 512, characteristics about the circles representing source devices 210 are used to represent additional information. For example, the size of the circle represents the number of attempts to log in from source device 210. Since the circles shown here are larger than other source devices 210 on the user interface, the circles correspond to sources devices 210 which had more attempts to log in than the other source devices 210. Additionally, the coloring of the circles represents a pie chart. The pie chart conveys information regarding the result of the attempt to log in (e.g., whether the attempt was a successful attempt, a failed attempt, or an unknown result). For these three source devices 210 in this cluster, identified by the IP addresses 140.108.1.11, 140.108.1.12, and 140.108.1.90, the largest colored part of each circle represents a successful attempt. A triangle configuration that includes source devices 210 on the same network (e.g., judging by the similar IP addresses of each source device 210) that also have many successful attempts to log in for each source device 210 may correspond to a proxy cluster. In this scenario, the operator using user interface may choose not to block traffic associated with these three source devices 210.

As shown by reference number 514, the user interface includes a dialog box with IP addresses and other information. This dialog box is explained in further detail in connection with FIGS. 5D-5F. As shown by reference number 516, the user interface includes a dialog box with dates and other information. This dialog box is explained in further detail in connection with FIGS. 5G-5J.

Figure 5C:
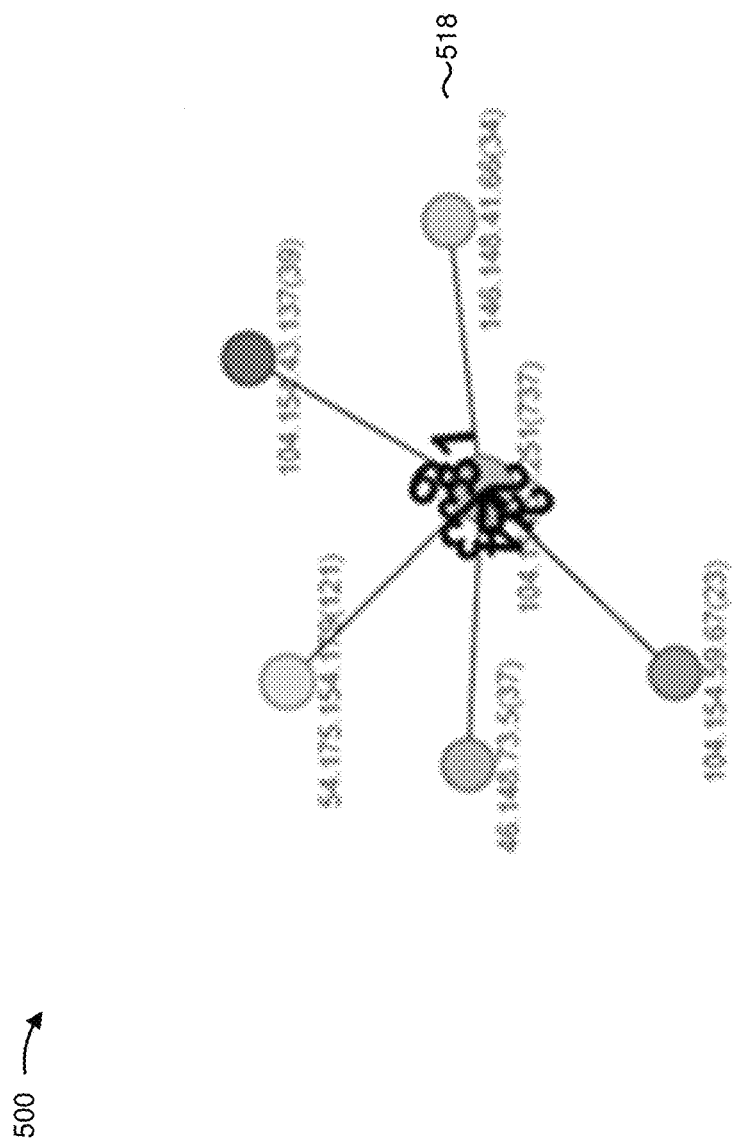

As shown in FIG. 5C, and by reference number 518, the user interface can represent the information in different ways. For example, for the cluster shown, the circles and the lines represent the same details as described above, but the circles do not include a pie chart, and the quantity of jumps is not represented with an arrow indicating direction, but instead are presented closer to a particular source device 210, indicating that the particular source device 210 is the originator of the transactions (i.e., the first source device 210). Furthermore, the IP address has a number in parenthesis next to the IP address. The number in parenthesis shows the number of attempts to log in associated with source device 210.

As shown, these source devices 210 are in a hub and spoke pattern with IP addresses that are not related (e.g., meaning there is a hub source device 210 with connections to multiple spoke source devices 210 that are not connected to one another by a common network). The hub source device 210 has made 737 log in attempts, and each of the spoke source devices 210 have made less than 125 attempts (23, 37, 121, 39, and 34 respectively). A number of attempts were made with a credential from the hub source device 210 (the first source device 210) and then were used in attempts from the spoke source devices 210 (the second source devices 210), but no attempts with a credential were made in the spoke source devices 210 before being used by the hub source device 210. This pattern and these numbers may indicate a hacker is attempting to use credentials from the hub source device 210 and that when the credentials fail, the hacker is attempting to use the credentials from the spoke source devices 210. A user or management device 250 may determine to blacklist the hub source device 210 based on this information.

Figure 5D:
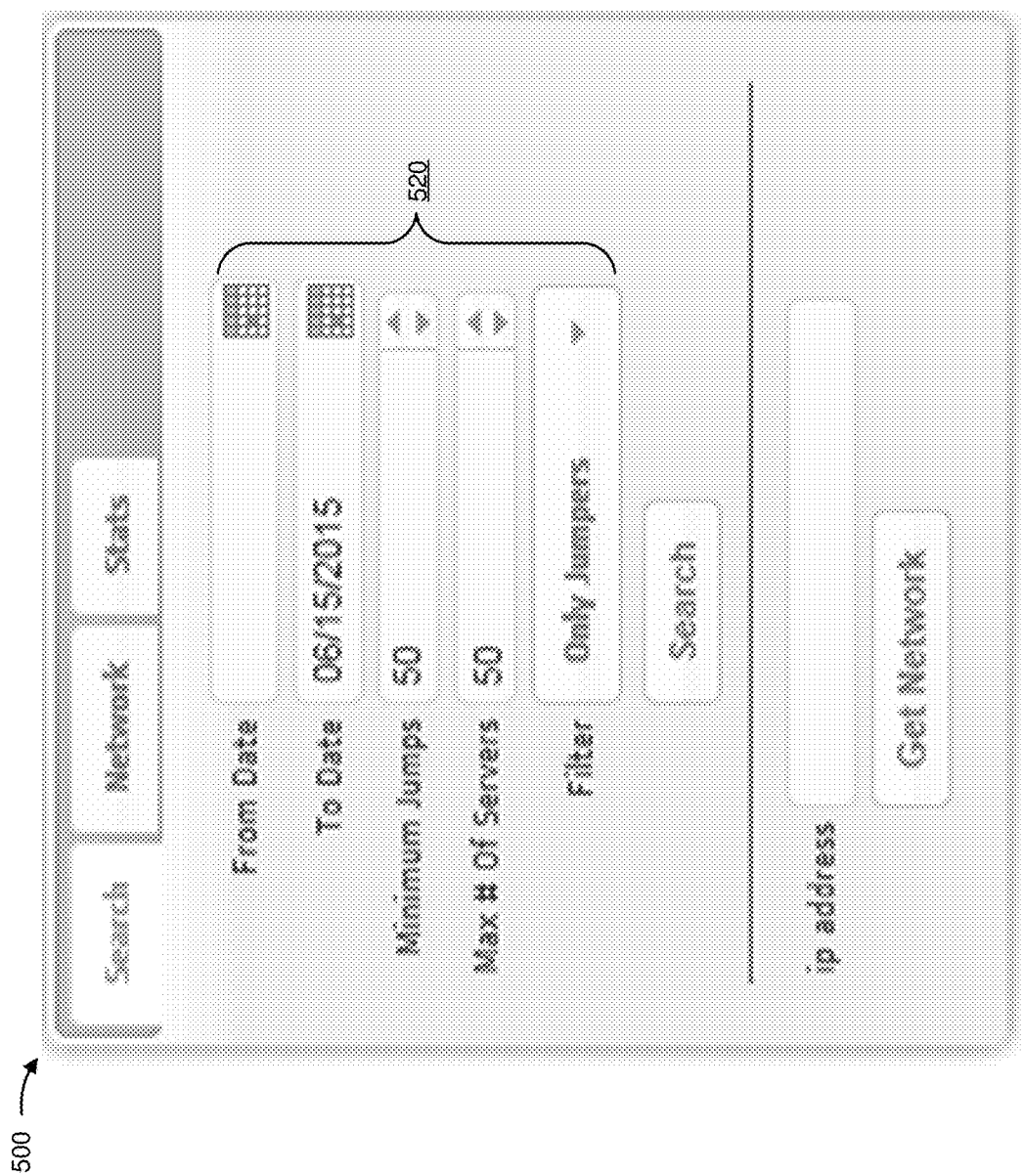

As shown in FIG. 5D, and by reference number 520, the user interface includes a dialog box, under a tab labeled "Search," which allows the operator using the user interface to manipulate the information shown on the user interface. For example, the operator may enter a start date and end date in which to analyze the information from the network logs. The operator may also enter a minimum number of jumps (e.g., the number of times that a credential was used for a log in attempt originating from the first source device 210, and then subsequently for a log in from the second source device 210). By entering the minimum number of jumps, only connected pairs which meet or exceed the number of jumps may be displayed on the user interface. The operator may also limit the number of source devices 210 displayed by changing the field labeled "maximum # of servers."

Figure 5E:
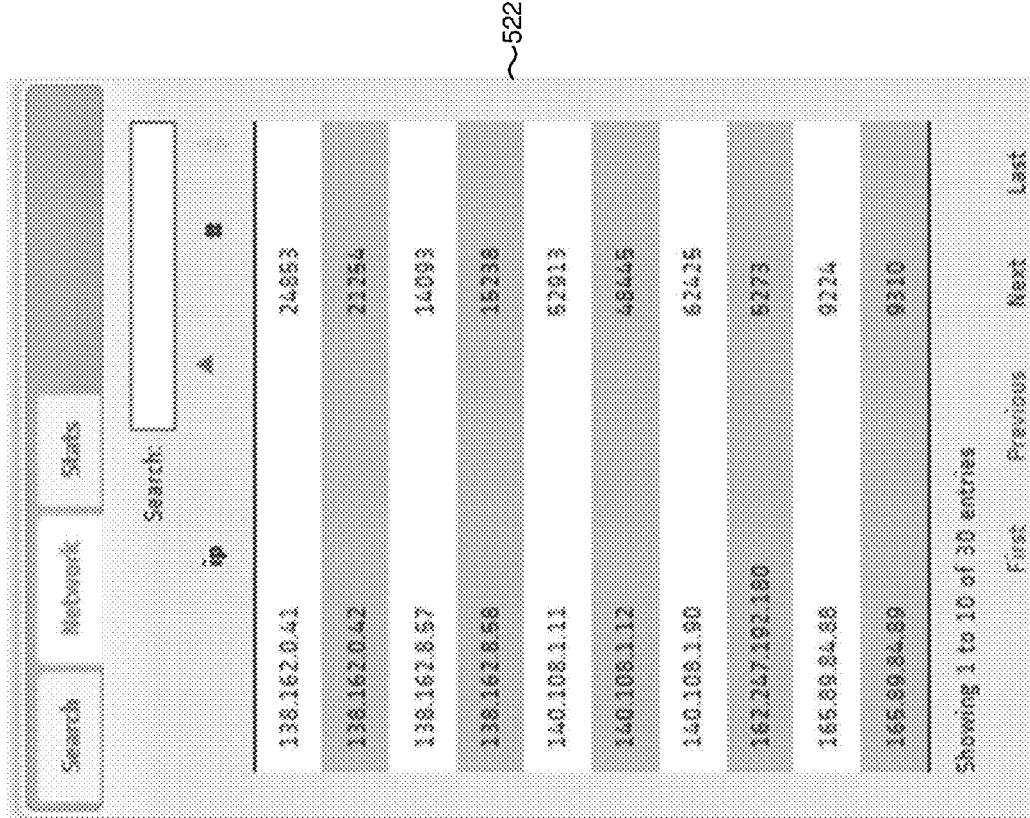

As shown in FIG. 5E, and by reference number 522, the user interface includes a dialog box, under a tab labeled "Network," which allows the operator to view the number of attempts to log in associated with each source device 210. As shown, the dialog box shows a table associating the IP address of source device 210, under the heading labeled "ip," with the number of attempts to log in, under the heading labeled "#."

Figure 5F:
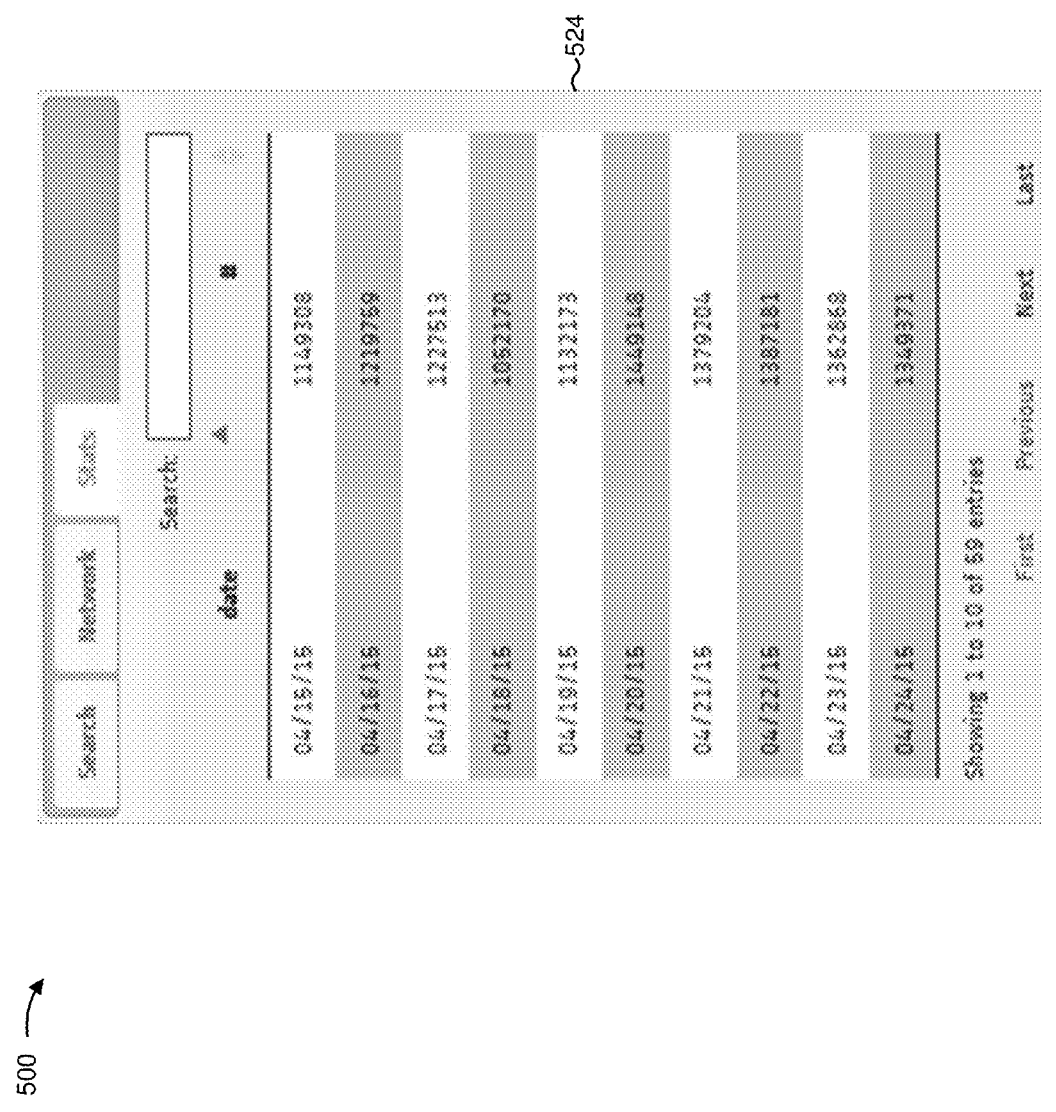

As shown in FIG. 5F, and by reference number 524, the user interface includes a dialog box, under a tab labeled "Stats," which allows the operator to view the number of attempts to log in made each day. As shown, the dialog box shows a table associating the date with the number of attempts to log in, represented by the "#" heading.

Figure 5G:
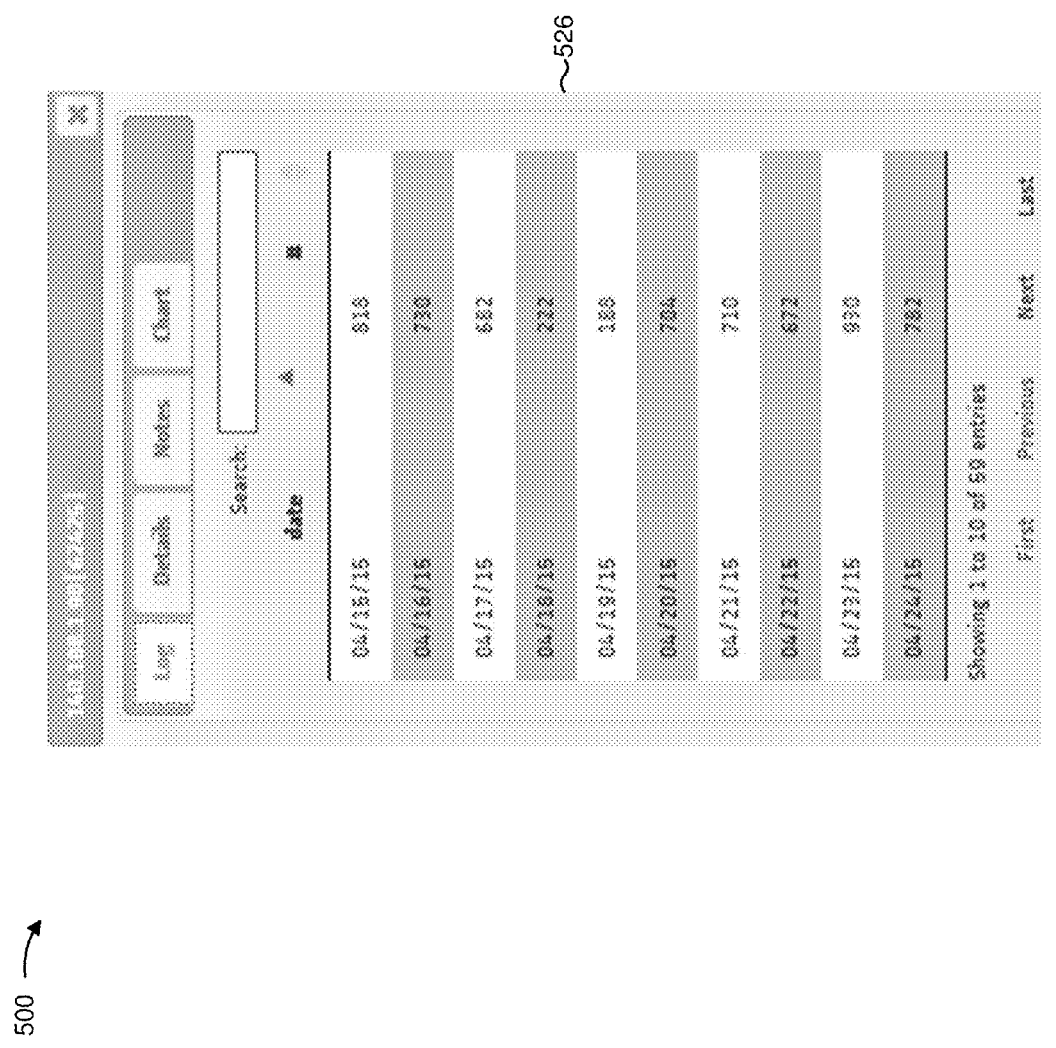

As shown in FIG. 5G, and by reference number 526, the user interface includes a dialog box, under a tab labeled "Log," which allows the user to view the number of attempts to log in for each day associated with a particular source device 210. As shown, the source device 210 is indicated at the top of the dialog box by the IP address. The dialog box shows a table associating the date with the number of attempts to log in.

Figure 5H:
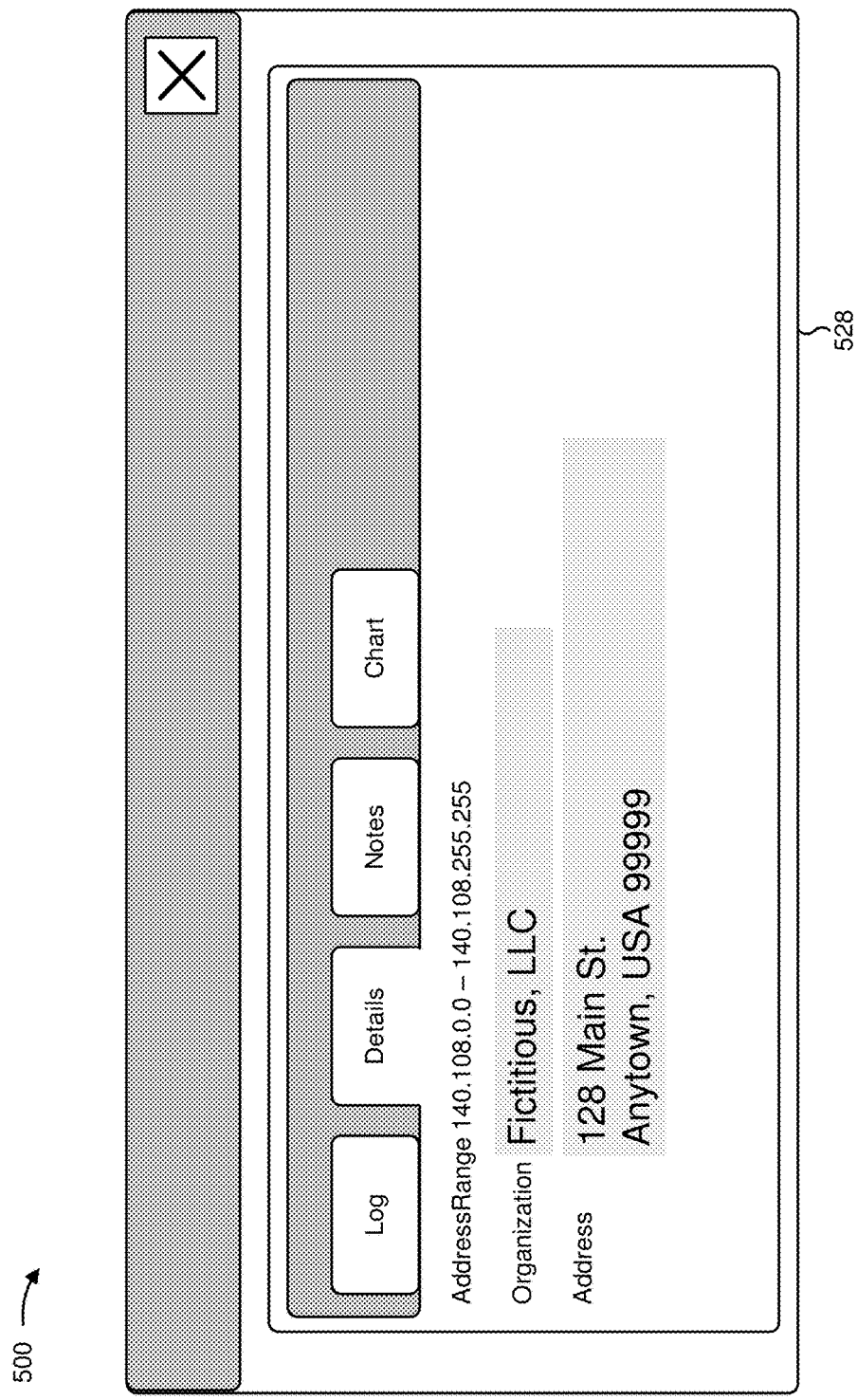

As shown in FIG. 5H, and by reference number 528, the user interface includes a dialog box, under a tab labeled "Details," which allows the operator to view the details associated with the particular source device 210. For example, the dialog box indicates an IP address range associated with the organization associated with the particular source device 210, and displays the organization's name and address.

Figure 5I:
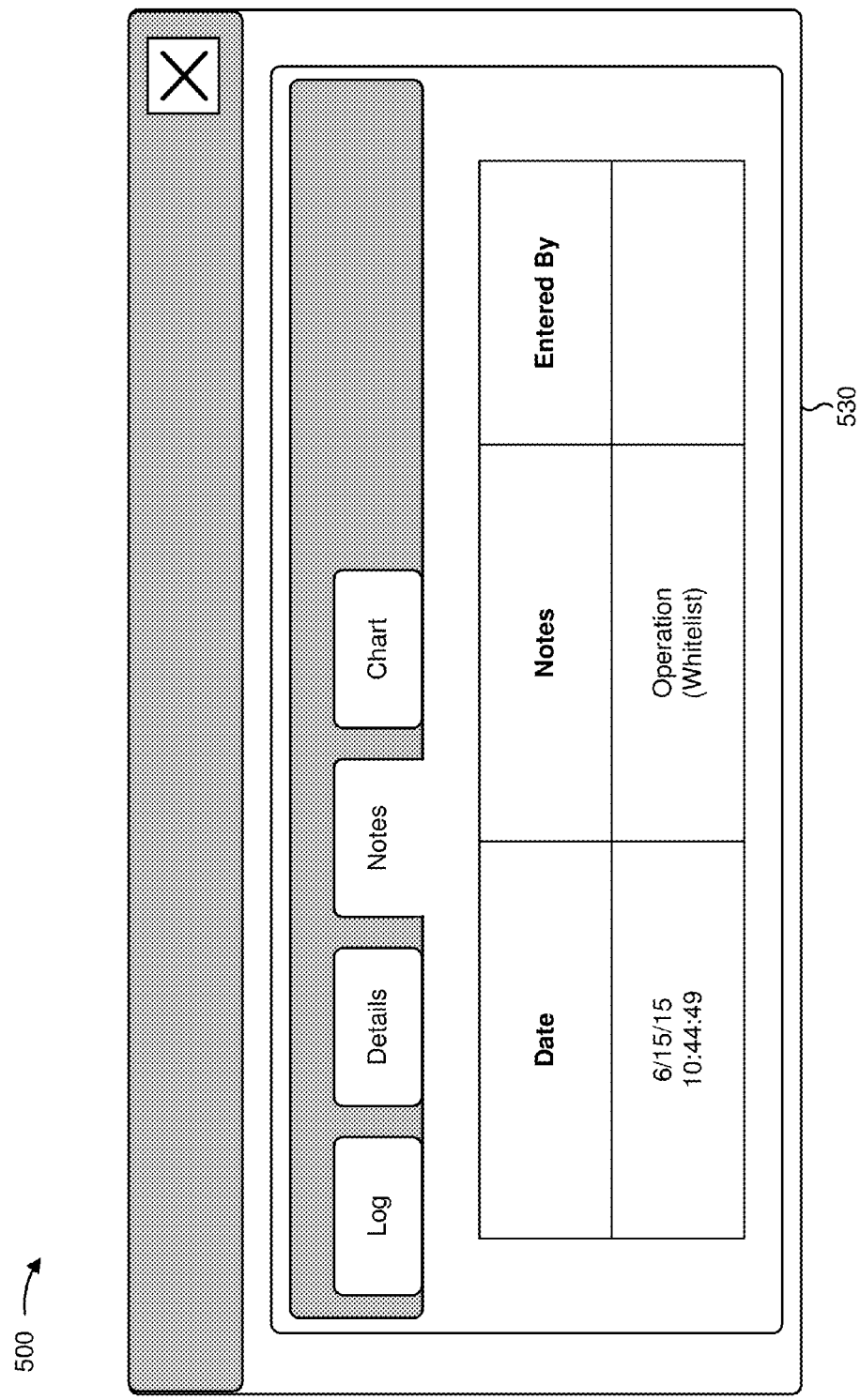

As shown in FIG. 5I, and by reference number 530, the user interface includes a dialog box, under a tab labeled "Notes," which allows the operator to see a history of actions that the operator(s) have taken with the particular source device 210. As shown, the dialog box indicates the date and time an action was taken, the action (e.g., that the source device 210 was added to the whitelist), and the name of the operator that took the action.

As shown in FIG. 5J, and by reference number 532, the user interface includes a dialog box, under a tab labeled "Chart," which allows the operator to view a bar graph that corresponds the dates of the attempts to log in using the particular source device 210 with the number of attempts to log in using the particular source device 210. The information displayed in the dialog box here is the same as in the dialog box under the label "Log," but is in graphical form.

Figure 5K:
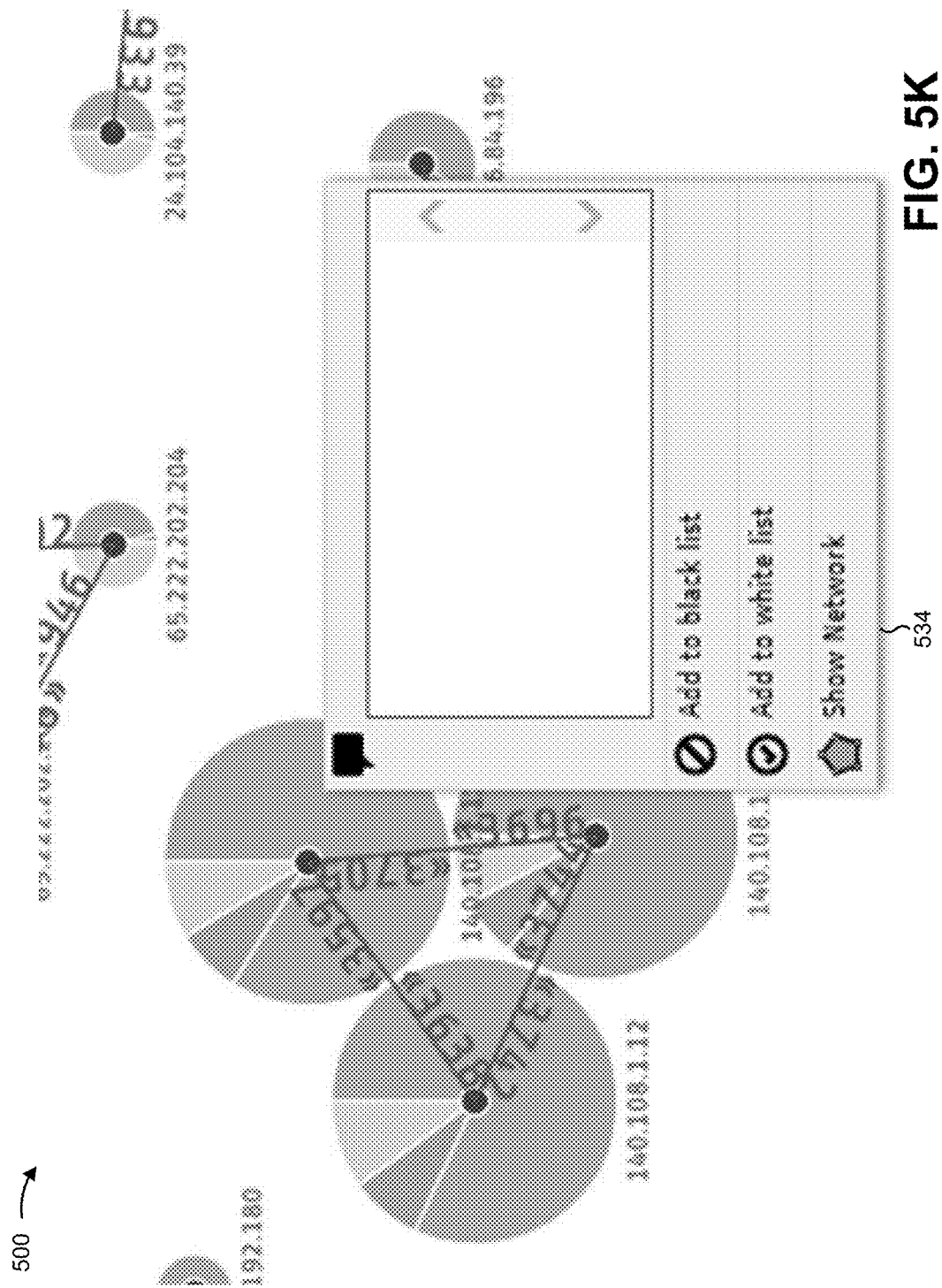

As shown in FIG. 5K, and by reference number 534, the operator may interact with the user interface by selecting source device 210 (e.g., by right clicking on source device 210) and interfacing with another dialog box. The dialog box brings up information about source device 210 and allows the user to either add source device 210 to the blacklist, add source device 210 to the whitelist, or to show the network associated with source device 210.

Figure 5L:
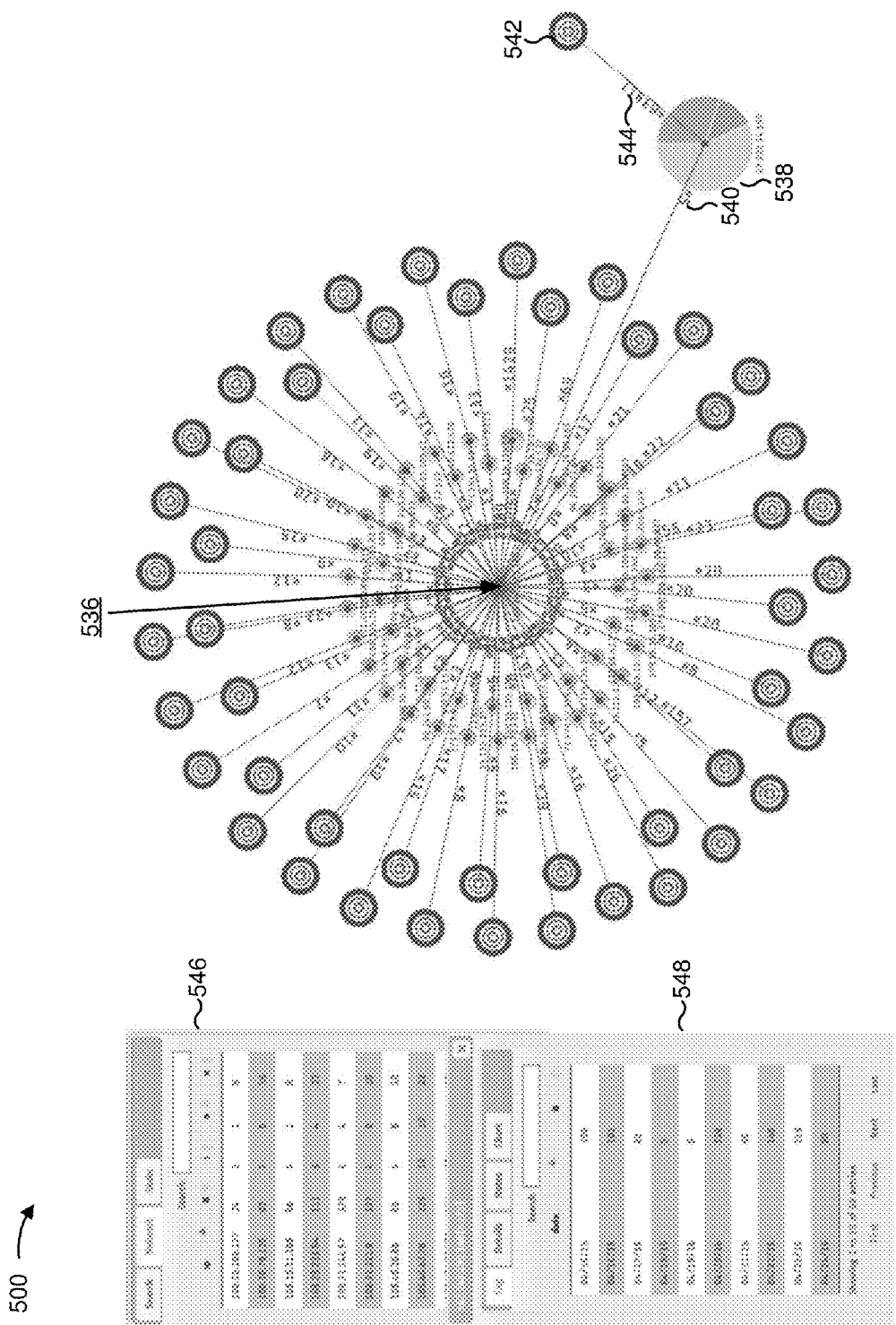
Figure 5M:
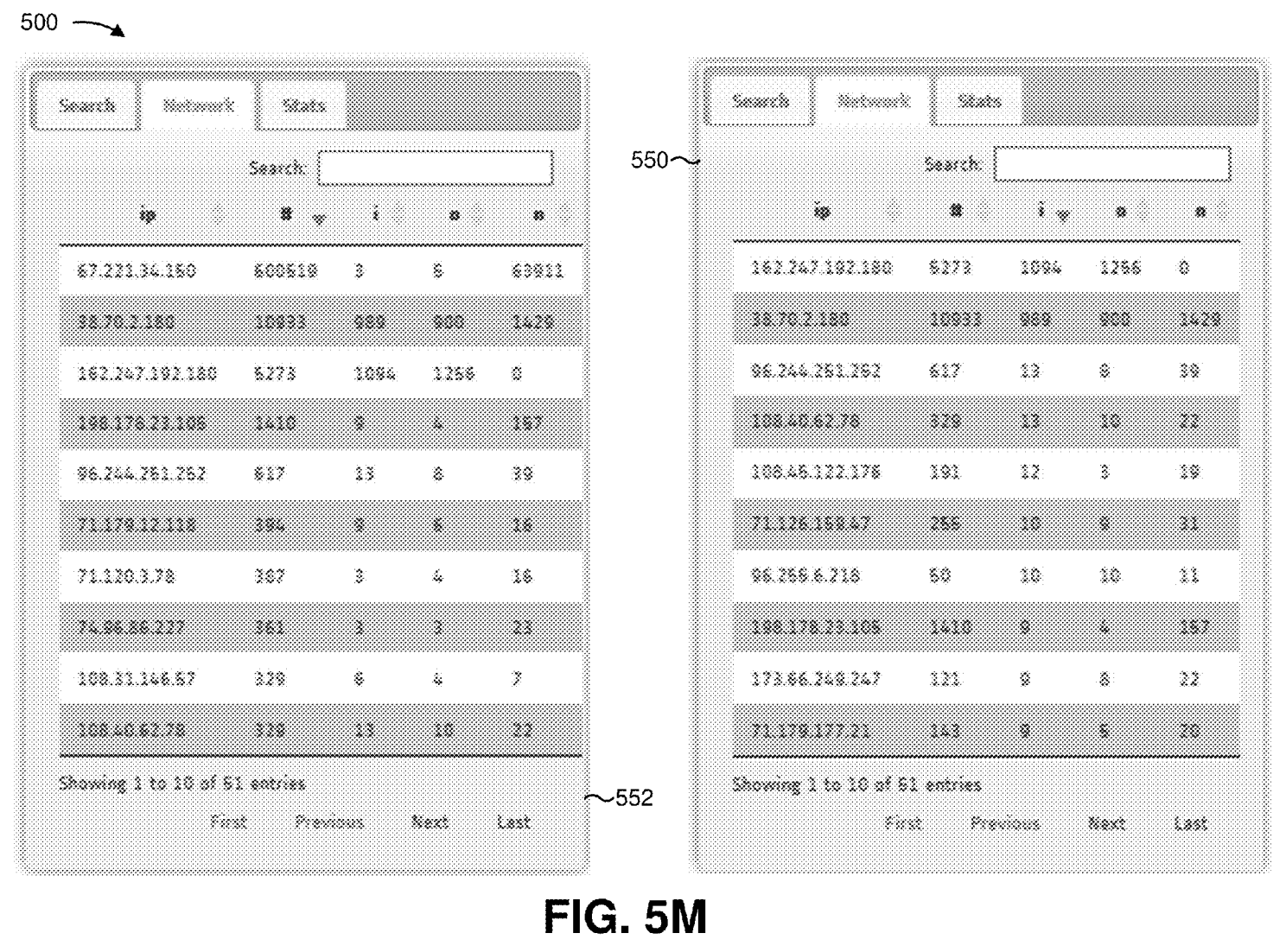
Figure 5N:
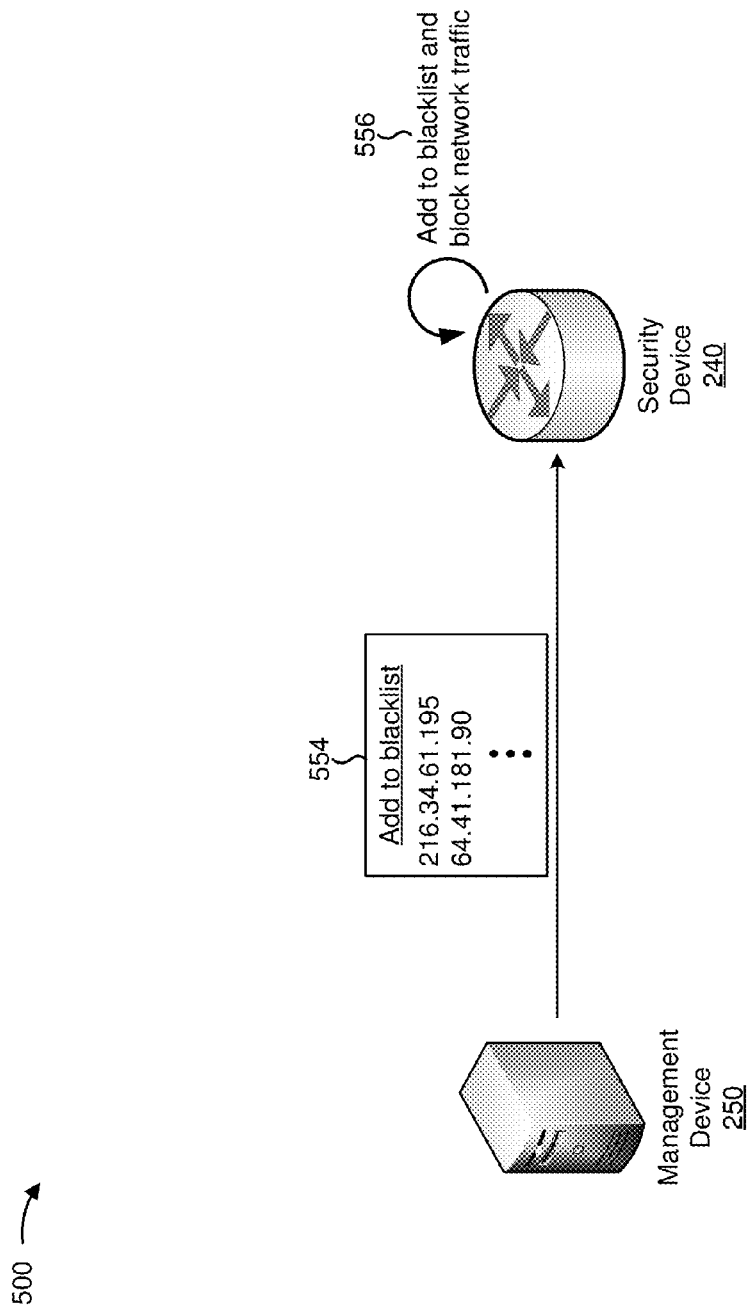

As shown in FIG. 5L, the user interface can be used to display information relating to a primary source device 210. As shown by reference number 536, the primary source device 210 is displayed in the middle of the screen. The primary source device 210 is connected to many secondary source devices 210 by lines that connect the primary source device 210 with each of the secondary source devices 210. As shown by reference number 538, the operator may interact with one of the secondary source devices 210 by selecting the secondary source device 210. As shown, the user has selected secondary source device 210 represented by the IP address 67.223.34.150. The selected secondary source device 210 is represented by a circle with a pie chart as described above. As shown by reference number 540, a number is associated with the number of jumps from the primary source device 210 (the first source device 210) to the selected secondary source device 210 (the second source device 210). Similarly, the number of jumps from the selected secondary source device 210 to the primary source device 210 is shown with an arrow near to the primary source device 210.

As shown by reference number 542, the user interface displays a connection between the selected secondary source device 210 and a bullseye that represents a network of devices. The user interface has a bullseye connected to each of the secondary source devices 210. As shown by reference number 544, the number on the line between the bullseye and the selected secondary source device 210 represents the number of devices that are part of the network of devices. In the example shown, the network connected to the selected secondary source device 210 has 63,911 devices.

As shown by reference number 546, the user interface includes a dialog box with IP addresses of the secondary source devices 210 and associated information. This dialog box is explained in further detail in connection with FIG. 5M. As shown by reference number 548, the user interface contains a dialog box with dates and other information about the primary source device 210, which is similar to the dialog box described above in connection with FIG. 5G.

As shown in FIG. 5M, and by reference numbers 550 and 552, the user interface includes a dialog box, under a tab labeled "Network," which allows the user to view information regarding the secondary source devices 210 in relation to the primary source device 210. For example, for each secondary source device 210, the dialog box displays a number of attempts to log in (represented by the column labeled "#"), a number of jumps to the primary source device 210 from the secondary source device 210 (or incoming jumps, represented by the column labeled "i"), a number of jumps from the primary source device 210 to the secondary source device 210 (or outgoing jumps, represented by the column labeled "o"), and a number of devices to which the secondary source device 210 is connected in a network (represented by the column labeled "n"). For example, the first listed secondary source device 210 shown by reference number 552 is secondary source device 210 identified by an IP address of 67.221.34.150. The first listed secondary source device 210 is the same source device 210 shown by reference number 538 in FIG. 5L. There were 600,519 attempts to log in made from this first listed secondary source device 210. The first listed secondary source device 210 had three incoming jumps from the primary source device 210 and five outgoing jumps to the primary source device 210. Furthermore, the first listed secondary source device 210 is connected to a network associated with 63,911 devices.

As shown in FIG. 5N, and by reference number 554, management device 250 determines to add a few source devices 210 to the blacklist and sends an instruction to block traffic from these few source devices 210 to the security device 240. As shown by reference number 556, security device 240 adds the few source devices 210 from the instruction to the blacklist and thereafter blocks traffic associated with the few source devices 210.

As indicated above, FIGS. 5A-5N are provided merely as an example. Other examples are possible and may differ from what was described with regard to FIGS. 5A-5N.

Implementations described herein may aid in detecting compromised credentials and compromised devices by utilizing information about a quantity of times a credential was used by different source devices in consecutive transactions. In turn, operators, using these implementations, may block traffic from the compromised devices and/or may block the compromised credentials, thereby increasing the security of the protected system and limiting the use of processor and memory resources, of the protected system, being used in association with transactions from these compromised devices or using these compromised credentials.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:
receive network traffic information, associated with a plurality of transactions, that indicates, for each transaction of the plurality of transactions, a credential associated with the transaction and a source device identifier associated with the transaction;
determine, based on the network traffic information, a quantity of times that a common credential was used in two transactions occurring at different times and originating from different source devices;

provide information that identifies the quantity of times and the different source devices;
determine whether to block network traffic associated with a source device, of the different source devices, based on at least one of:
user input received based on providing the information that identifies the quantity of times and the different source devices, or
the quantity of times; and
selectively provide an instruction to block the network traffic associated with the source device based on determining whether to block the network traffic.

2. The device of claim 1, where the one or more processors, when determining whether to block the network traffic, are to:
determine whether to block the network traffic associated with the source device based on the user input.

3. The device of claim 1, where the one or more processors, when determining whether to block the network traffic, are to:
determine, without the user input, whether to block the network traffic associated with the source device based on the quantity of times.

4. The device of claim 1, where the one or more processors, when providing the information, are to:
provide the information for display via a user interface; and
where the user input is received based on a user interaction with the user interface.

5. The device of claim 1, where the one or more processors, when determining the quantity of times, are to:
determine the quantity of times that the common credential was used in the two transactions,
the two transactions occurring within a threshold amount of time of each other.

6. The device of claim 1, where the one or more processors, when determining whether to block the network traffic, are to:
determine, based on the network traffic information, a percentage of non-successful transactions associated with at least one of the different source devices;
provide information that identifies the percentage; and
determine whether to block the network traffic based on the percentage and the quantity of times.

7. The device of claim 1, where the one or more processors, when determining whether to block the network traffic, are to:
determine source device identifiers corresponding to the different source devices; and
determine whether to block the network traffic based on the quantity of times and a relationship between the source device identifiers.

8. A computer-readable medium storing instructions, the instructions comprising:
one or more instructions that, when executed by one or more processors, cause the one or more processors to:
receive network traffic information, associated with a plurality of transactions, that indicates, for each transaction of the plurality of transactions, a credential associated with the transaction and a source device identifier associated with the transaction;
identify, based on the network traffic information, a quantity of times that a common credential was used in consecutive transactions that use the common credential,
the consecutive transactions occurring at different times and originating from different source devices;
provide information that identifies the quantity of times and the different source devices;
determine whether to block network traffic associated with a source device, of the different source devices, based on the quantity of times; and
selectively provide an instruction to block the network traffic associated with the source device based on determining whether to block the network traffic.

9. The computer-readable medium of claim 8, where the one or more instructions, that cause the one or more processors to determine whether to block the network traffic, cause the one or more processors to:
determine whether to block the network traffic associated with the source device based on the quantity of times and user input received based on providing the information that identifies the quantity of times and the different source devices.

10. The computer-readable medium of claim 8, where the one or more instructions, that cause the one or more processors to provide the information, cause the one or more processors to:
provide the information for display via a user interface;
receive user input based on a user interaction with the user interface; and
determine whether to block the network traffic based on the user input.

11. The computer-readable medium of claim 8, where the one or more instructions, that cause the one or more processors to identify the quantity of times, cause the one or more processors to:
identify the quantity of times that the common credential was used for the consecutive transactions,
the consecutive transactions occurring within a time range determined based on user input.

12. The computer-readable medium of claim 8, where the one or more instructions, that cause the one or more processors to determine whether to block the network traffic, cause the one or more processors to:
identify, based on the network traffic information, a percentage of non-successful transactions associated with at least one of the different source devices;
provide the percentage; and
determine whether to block the network traffic based on the percentage and the quantity of times.

13. The computer-readable medium of claim 8, where the one or more instructions, that cause the one or more processors to determine whether to block the network traffic, cause the one or more processors to:
receive information that identifies a quantity of devices in communication with at least one of the different source devices via a network;
provide the information that identifies the quantity of devices; and
determine whether to block the network traffic based on the quantity of devices.

14. The computer-readable medium of claim 8, where the one or more instructions, that cause the one or more processors to determine whether to block the network traffic, cause the one or more processors to:
identify, based on the network traffic and the quantity of times, a quantity of unique common credentials used for transactions associated with the quantity of times;
provide the quantity of unique common credentials; and determine whether to block the network traffic based on the quantity of unique common credentials.

15. A method, comprising:

receiving, by a device, network traffic information, associated with a plurality of transactions, that indicates, for each transaction of the plurality of transactions, a credential and a source device identifier associated with the transaction;

identifying, by the device and based on the network traffic information, a quantity of times that a common credential was used for two consecutive transactions that use the common credential, the two consecutive transactions occurring at different times and originating from different source devices;

providing, by the device, information that identifies the quantity of times and the different source devices;

determining, by the device, whether to block network traffic associated with a source device, of the different source devices, based on user input that is based on providing the information that identifies the quantity of times and the different source devices; and selectively providing, by the device, an instruction to block the network traffic associated with the source device based on determining whether to block the network traffic.

16. The method of claim 15, where determining whether to block the network traffic comprises:

determining whether to block the network traffic based on the quantity of times.

17. The method of claim 15, where providing the information comprises:

providing the information for display via a user interface; and where the user input is received based on a user interaction with the user interface.

18. The method of claim 15, where determining whether to block the network traffic comprises:

identifying source device identifiers associated with the different source devices; and determining whether to block the network traffic based on the quantity of times and a relationship between the source device identifiers.

19. The method of claim 15, where determining whether to block the network traffic comprises:

receiving information that identifies a quantity of devices in communication with at least one of the different source devices via a network;

providing the information that identifies the quantity of devices; and determining whether to block the network traffic based on the quantity of devices.

20. The method of claim 15, where determining whether to block the network traffic comprises:

determining, based on the quantity of times and the network traffic information, a quantity of unique common credentials that were used in transactions associated with the quantity of times;

providing the quantity of unique common credentials; and determining whether to block the network traffic based on the quantity of unique common credentials.

\* \* \* \* \*